United States Patent [19]

Johnson et al.

[11] Patent Number: 5,695,895
[45] Date of Patent: Dec. 9, 1997

[54] RANDOMISED MASK FOR A DIFFUSING SCREEN

[75] Inventors: William Nevil Heaton Johnson, Guernsey, England; Nicholas John Phillips, Leicestershire, United Kingdom

[73] Assignees: Nashua Corporation, Nashua, N.H.; Nashua Photo Limited, Devon, England

[21] Appl. No.: 564,115

[22] PCT Filed: Jun. 14, 1994

[86] PCT No.: PCT/GB94/01281

§ 371 Date: Apr. 24, 1996

§ 102(e) Date: Apr. 24, 1996

[87] PCT Pub. No.: WO94/29768

PCT Pub. Date: Dec. 22, 1994

[30] Foreign Application Priority Data

Jun. 15, 1993 [GB] United Kingdom ............... 9312339
Jun. 17, 1993 [GB] United Kingdom ............... 9312480

[51] Int. Cl.⁶ .................................................. G03F 9/00
[52] U.S. Cl. ....................................... 430/5; 430/321
[58] Field of Search ................. 430/5, 321; 385/33, 385/119

[56] References Cited

U.S. PATENT DOCUMENTS 3,625,686  12/1971  Kitano .
4,360,372  11/1982  Maciejko ........................... 383/119
4,674,834   6/1987  Margolin .

FOREIGN PATENT DOCUMENTS 0294122  12/1988  European Pat. Off. .
0479490   9/1991  European Pat. Off. .
1499135   1/1978  United Kingdom .
9118304  11/1991  WIPO .
9216075   9/1992  WIPO .

*Primary Examiner*—S. Rosasco
*Attorney, Agent, or Firm*—Webb Ziesenheim Bruening Logsdon Orkin & Hanson, P.C.

[57] ABSTRACT

A mask through which a sheet or layer of a photopolymerizable monomer can be exposed to polymerizing light is manufactured by placing a fiber optic plate, or a ground glass plate or the equivalent over the emulsion layer of a photographic plate and exposing the photographic emulsion, through the fiber optic plate or ground glass plate, by a laser beam scanned across the plate in a raster. By this technique, there is produced, over the photographic plate, a random speckle pattern of substantially the same density and intensity over the whole plate. The photographic plate is then developed and used as a master to produce "daughter" masks from glass plates having an opaque thin layer of metallic chromium on one side, by coating such thin layer with photoresist, using the master to record, by direct contact printing, the speckle pattern on the photoresist, treating the photoresist to remove it from the regions corresponding to the speckles and etching the plate bearing the chromium layer and resist coating to remove the chromium from the regions from which the resist has been removed to form light transmitting apertures corresponding to these regions. Diffusion screens produced using a mask formed in this way incorporate sufficient randomness in the distribution of the light-modifying features thereon to avoid diffraction effects and to avoid Moire effects when used in conjunction with video displays which comprise regular arrays of phosphor dots or of pixels.

20 Claims, 2 Drawing Sheets

RANDOMISED MASK FOR A DIFFUSING SCREEN

THIS INVENTION relates to the manufacture of a diffusing screen, for example a rear-projection or depixelating screen, by exposure of a sheet or layer of a transparent photopolymerisable monomer to polymerising light through an opaque mask having light transmitting apertures, and thereby producing selective polymerisation of the photopolymerisable material in the regions thus exposed. More particularly, the invention is concerned with the manufacture of such a mask for use in the manufacture of such a diffusion screen. European Patent EP0294122B discloses a technique for manufacturing a rear-projection screen in the form of a transparent sheet of photopolymer bearing an array of microlenses which are in the form of graded refractive index lenses, the diffusing screen comprising an integral sheet of the transparent photopolymer with each of said lenses being formed by a respective region of said sheet extending between the surfaces of the sheet, with the refractive index, in said region, varying gradually with radial distance from the optical axis of each said lens.

In the technique described in European Patent EP0294122B the graded refractive index lenses are formed by selective exposure of a photopolymerisable monomer to a pattern of dots, such exposure being in ultra-violet light or suitable visible polymerising light and being effected by "contact" exposure through a mask having an array of circular holes formed therein.

It has been found that if, in a technique similar to that disclosed in EP0294122B, at least one surface of the monomer is left free to deform during polymerisation, e.g. by stripping from said surface any covering layer of other material, a surface relief pattern is produced which enhances the graded refractive index effect and may even predominate. For example, it has been found that in such circumstances a domed region tends to be produced where the monomer has been exposed to a circular patch of light and a concave hollow tends to be produced where the monomer has been masked from the photopolymerising light by a circular opaque area of the mask surrounded by a light transmitting region.

International Patent Publication WO92/16075, in the name of the present applicants, discloses the use of a microlens screen of the kind described in EP0294122B in conjunction with an LCD pixelated video display, for example of the kind used in hand-held or "pocket" television receivers, hand-held video games, etc. and in which the primary function of the microlens screen is to "de-pixelate" the LCD screen, that is to say, to render the individual pixels unnoticeable to the eye, particularly when the LCD screen is viewed under magnification. In particular, when used in conjunction with a pixelated colour video screen, having red, blue and green pixels, such a microlens screen prevents the individual pixels from being distinguished visually and ensures that the viewer has the impression, from the area of each set of three pixels, (red, blue and green), representing a particular "point" in the picture, of a corresponding area of a substantially uniform hue represented by a combination of the light intensities from the respective red, blue and green pixels.

Whilst the arrangement disclosed in WO92/16075 does, indeed, give significantly improved visual impression, compared with that obtained using a pixelated LCD screen alone, it has been found that, under certain conditions, where the microlens screen comprises an entirely regular array of microlenses, (for example where each microlens is of the same size and the microlenses are arranged in regularly spaced rows and columns), disturbing interference effects are perceptible, both "colour fringing" diffraction effects and Moiré effects resulting from apparent interaction of the regularly spaced pixels in the LCD array and the regularly spaced microlenses in the microlens screen. Similar Moiré effects can arise when such a screen is used in conjunction with, for example, a colour CRT display of the shadow-mask type having regularly spaced phosphor dots or bars.

It is noted, in EP0294122, that diffraction and Moiré problems can be avoided by the injection of a controlled amount of randomness into what would otherwise be a totally regular array of microlenses.

SUMMARY OF THE INVENTION

It is an object of the present invention to provide a practical means whereby a diffusing screen having the requisite degree of randomness can be fabricated.

According to one aspect of the present invention there is provided a method of manufacturing a mask for use in making a diffusion screen of photopolymer, comprising (a) providing an optic fibre plate, as herein defined, in which a measure of randomisation is incorporated by random variation of the diameter, spacing and/or cross-sectional eccentricity of the optical fibres, and/or randomly interspersing opaque fibres among the light transmitting fibres, (b) providing a photosensitive recording layer, (c) superimposing said optic fibre plate on said photosensitive recording layer, (d) exposing said photosensitive recording layer to light through said optic fibre plate, (e) removing said optic fibre plate and deriving said mask from said photosensitive recording layer.

According to a further aspect of the invention, there is provided a method of making a diffusion screen comprising providing a layer of a transparent photopolymerisable medium, placing in contact with said layer a fibre optic plate as herein defined, exposing said photopolymerisable substance to polymerising light through said fibre optic plate whereby localised exposure of the medium takes place at the end of each fibre or light-transmitting channel of the fibre optic plate, and allowing the medium to polarise in said localised exposed regions.

The term "fibre optic plate" as used herein signifies a light-transmitting planar plate which behaves as if it comprised a large number of optical fibres, (for example glass fibres), arranged as a "bundle" in which the fibres run generally parallel with each other and generally perpendicular to the major faces of the plate, each end of each fibre terminating in a respective face of the plate with the interstices between the fibres being filled with an opaque medium. Thus, the individual optical fibres form "light pipes" oriented for the conduction of light from one face of the plate to the other generally at right angles to the plane of the plate. Such a fibre optic plate may be formed by forming initially a cylindrical rod of transparent glass surrounded circumferentially by a layer of opaque, black glass fused to the transparent glass, the glass being at a temperature at which it is plastic and drawable, "pulling" the composite rod of glass to increase its length and reduce its diameter, dividing the pulled rod into a plurality of lengths which are placed together in a bundle and drawn again so that the individual lengths fuse together affording an integral body of glass comprising several transparent approximately cylindrical regions extending through an opaque black matrix, dividing the last-noted body again into several lengths which are again placed together and pulled once again, the resultant being cut into lengths, bundled together and pulled again and so on, the number of transparent cylindrical regions being multiplied at each stage and the diameters of said regions being reduced at each stage until the required pitch and diameter of such transparent cylindrical regions is reached. The average diameter of each transparent region or "fibre" at this stage may be around 5μ (5×10⁻⁶ meter) with concomitant spacing between fibres. The resulting unitary "log" of fused glass is then allowed to cool at an appropriate rate before being cut into individual slices perpendicularly to the direction in which said transparent regions or "fibres" extend, each such slice forming a respective fibre optic plate. The opposite major faces of each such plate are then polished to optical standard.

Due to such variations, resulting from the "pulling" process, as minor twisting of the transparent channels or "fibres" in the bundle, variations in diameter between transparent channels or fibres, varying non-circularity or eccentricity of individual channels or fibres resulting from normal manufacturing tolerances, etc., such a fibre optic plate has a certain inherent randomness and it has been discovered by the inventors that the degree of randomness present forms an ideal basis for the production of a master screen, incorporating a corresponding degree of randomness, for the quantity production of microlens screens as herein defined. If desired, an additional degree of randomness can be injected by adding to the bundle, at random during the pulling and bundling process, rods of black glass so that, in the finished fibre optic plate there are randomly interspersed, in the bundle of transparent light channels or "fibres" in the fibre optic plate, a minor amount of non-light-transmitting "channels" or "fibres".

It would also be possible to produce a "fibre optic plate" within the meaning of the term as used herein by forming a "log" or bundle of optical fibres of relatively great length, the fibre bundle being impregnated with a selected opaque, preferably black, cement and the bundle being compressed transversely to the longitudinal direction of the bundle prior to curing of the cement to ensure that the individual optical fibres are packed closely together. Fibre optic face plates may then be formed by sawing thin slices from the "log" thus formed and polishing the opposite faces of each plate to optical quality. Conceivably, a similar product could be made using, for example, transparent plastics fibres cemented together by opaque resin.

Again, due to such factors as minor twisting of the optic fibres in the bundle, variations in diameter between individual optic fibres, varying spacing between adjacent fibres, varying non-circularity or eccentricity of individual fibres resulting from normal manufacturing tolerances, etc., such a fibre optic plate has a certain inherent randomness. Likewise, an additional degree of randomness can be injected by randomly interspersing, in the bundle of optic fibres used to make the fibre optic plate, a minor amount of non-light-transmitting fibres, for example, fibres of opaque or black glass or plastics.

According to yet another aspect of the invention there is provided a method of manufacturing a mask for use in making a diffusion screen of photopolymer, comprising providing a ground glass screen or a functional equivalent of such, having a measure of randomisation in the spatial distribution of its light transmitting characteristics, providing a photosensitive recording layer, superimposing said ground glass plate or equivalent on said photosensitive recording layer, exposing said photosensitive recording layer to light through said ground glass plate or equivalent, removing said ground glass plate or equivalent and deriving said mask from said photosensitive recording layer.

BRIEF DESCRIPTION OF THE DRAWINGS

An embodiment of the invention is described below by way of example with reference to the accompanying drawings in which.

DETAILED DESCRIPTION OF THE INVENTION

Figure 1:
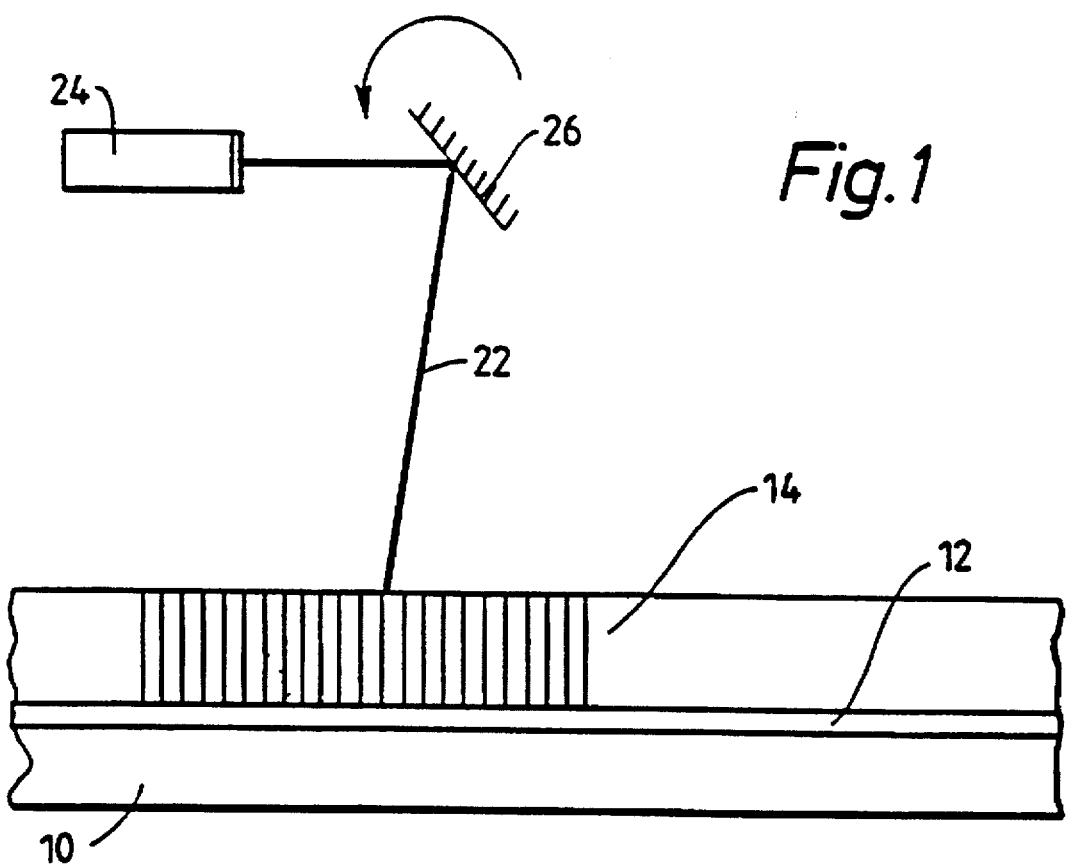
FIG. 1 is a schematic view in vertical section to a much enlarged scale, showing a photosensitive recording medium with superimposed fibre-optic plate, being scanned by a laser.
Figure 2:
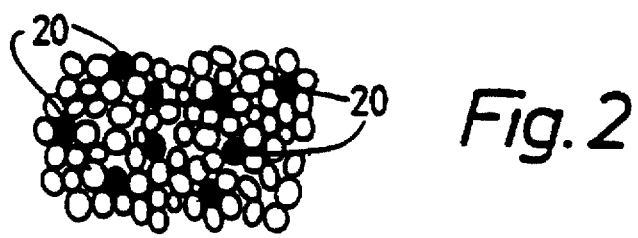
FIG. 2 is a schematic plan view of a portion of the fibre optic plate #14 as illustrated in FIG. 1.

Referring to the drawings, and referring first to FIG. 1, a photosensitive recording medium, for example, an Eastman-Kodak graphic arts photographic plate 10 with a silver halide emulsion layer 12 has, superimposed thereon, a fibre optic plate 14, the lower major face of the plate 14 lying flat against the exposed surface of the emulsion layer 12. As shown and as described above, the fibre optic plate 14 comprises a plurality of elongate light transmitting channels or fibres each of a length corresponding to the thickness of the plate 14 and each extending from the upper face to the lower face of the plate 14, and adjacent transparent channels or fibres being separated by opaque material. As indicated in exaggerated fashion in FIG. 2, there is a certain random variation, throughout the plate, in the spacing between adjacent transparent channels or fibres, fibre or channel diameter, etc. Whilst, in practice, a detailed view of a portion of the plate would appear far more regular than suggested by FIG. 2, nevertheless, there is sufficient random variation in the spacing etc. between adjacent transparent channels or fibres to counter the interference and Moiré effects referred to above.

As likewise indicated above, additional randomisation may be injected by interspersing, in the light-transmitting fibres, opaque or black fibres 20.

Referring to FIG. 1, the recording medium 12 is exposed, through the fibre optic plate, by means of a laser beam 22 from a scanning laser, the arrangement being such that the laser beam scans the recording medium/fibre optic plate sandwich in a scanning raster.

In one possible arrangement, the plate 10 and fibre optic plate 14 thereon are secured to a platen of a machine, which platen, in operation of the machine, is advanced over a fixed bed of the machine, after each line scan, in a direction perpendicular to the line, by an amount preferably significantly less than the diameter of the laser beam, for example 0.4 times such diameter. The diameter of the laser beam may be of the order of 1 mm, implying an advance of the platen, at each line, of 0.4 mm. The scanning action of the laser beam may be produced by directing the beam from the laser 24 onto a rotating mirror 26 from which the laser beam is reflected onto the fibre optic plate 14 and plate 10 on the machine platen.

After exposure of the photographic plate, the resulting "master" is used to produce a "daughter" chromium mask, by direct recording, by contact printing, of the pattern of microscopic dots formed in the developed emulsion layer 12, into a photoresist layer on a thin layer of metallic chromium on a transparent substrate, such as a glass plate or quartz plate followed by removal, for example by washing, of the unexposed resist in the regions corresponding with said dots, and subsequently etching the chromium in the regions so exposed to form microscopic holes or windows, in the chromium layer, the remaining photoresist being thereafter removed by washing or chemical processing. Such a chromium mask is durable and is capable of very high edge definition. Such daughter masks may then be used in volume production of microlens screens using photopolymer by the method disclosed in EP0294122B, or by the variations of such method disclosed in WO91/18304 incorporated herein by reference.

Whilst for the particular applications which are currently of interest it is preferred that the chromium masks may be of the kind comprising a pattern of light-transmitting patches or "apertures" in an opaque background, it will be appreciated that if desired a chromium mask may be produced having a pattern of opaque apertures in a light-transmitting background, by reversal processing of the photographic medium or use of a photoresist which becomes removable on exposure to light.

In the preferred method disclosed above, the exposure of the recording layer by raster scanning of a laser beam ensures uniformity of mean exposure over the whole recording plate, whilst the fibre optic plate, by virtue of the light-pipe effect of the individual optic fibres, minimises transverse scattering and spreading of the exposing light throughout the fibre optic plate and thus ensures high definition and contrast in the resulting array of exposed spots in the recording medium 12.

It has been found that a modified effect is produced if there is a separation between the fibre optic plate and the emulsion layer and, indeed, that adjustment of the effect produced can be obtained by adjustment of such spacing. The modified effect is significantly dependant on interference or holographic phenomena, and the resulting pattern on the photographic emulsion is a speckle pattern which is substantially random. (Whatever the spacing selected, of course, the gap between the fibre optic plate and the emulsion layer should be uniform unless a microlens screen of characteristics varying over its area is desired). To secure the desired spacing, which may be, for example, 200µ or greater, it may be advantageous to space the fibre optic plate from the emulsion layer 12 by a spacer of uniform thickness, for example a Mylar sheet of accurately known thickness, such spacer sheet either extending across the whole region between the optic fibre plate and the emulsion layer, or being, for example, in the form of a frame surrounding a central aperture which defines the used area of the optic fibre plate and photographic plate, with the "frame" supporting the fibre optic plate around its margins only.

Whilst it is preferred to utilise a fibre optic plate in the method disclosed above, acceptable results for some applications may be achieved using a ground glass plate in place of the fibre optic plate to produce a suitable speckle pattern on the recording medium. Any functional equivalent of a ground glass plate could be used, that is to say a light transmitting plate which, if illuminated uniformly from one side will provide, closely adjacent its opposite side, a variation in illumination, with spatial position in a plane parallel to and adjacent that of said other side, which variation has a measure of randomisation.

Where a ground glass plate is used, the ground surface should be placed uppermost, that is to say, the ground surface should be the surface further from the recording medium. This provides a suitable spacing between the ground surface and the photographic emulsion, equivalent to the controlled spacing which may be introduced between the fibre optic plate and the emulsion as discussed above. The laser light passing through the ground surface produces on the photographic emulsion an interference pattern which takes the form of a random speckle pattern. Whilst, in each line scan, there is a spread of light from the laser beam by the ground surface onto portions of the recording medium which will also be illuminated in the next line scan (and a corresponding spread in the direction of line scan), resulting in some loss of contrast, it is possible to recover some of this by using appropriate contrast-enhancing chemical techniques during development of the photographic plate. Where a ground glass plate is used, the mean spacing between speckles in the resulting pattern is roughly proportional to the wavelength of the laser light used and to the separation of the ground surface from the recording medium and inversely proportional to the diameter of the scanning beam.

A similar effect may be produced by blanket exposure of the recording medium to laser light through the ground glass plate or fibre optic plate although it is more difficult, in this case, to secure even (average) illumination over the whole area of the recording medium. In such an arrangement, where there is a substantial spacing between the ground glass plate and the emulsion surface, the shape of the plate affects the shape of the speckles, so that by using a rectangular plate rather than a square one, for example, the resulting speckles can be made to be preferentially elongate in one direction.

It is possible to use a refractive index-matching fluid between the optic fibre plate or the ground glass plate and the emulsion layer of the recording medium although it is believed that this will not generally be necessary.

Figure 3:
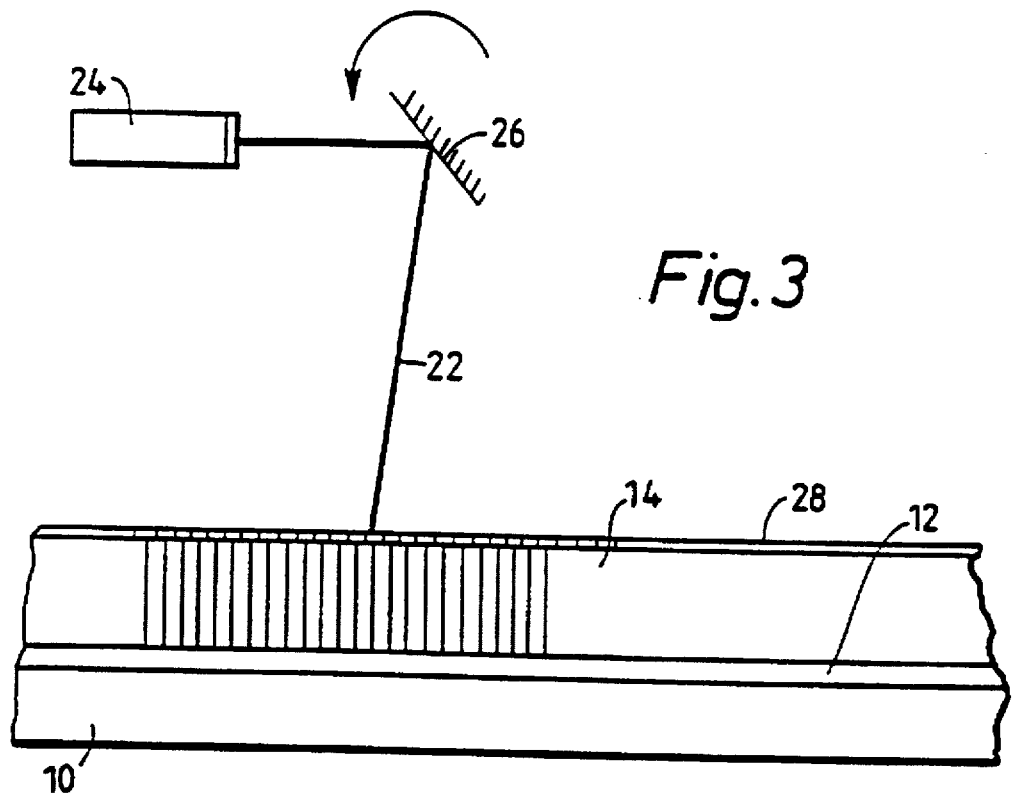
FIG. 3 is a view similar to FIG. 2 but showing a variant arrangement.

Further modification of the effect produced, whilst still retaining the desired degree of randomness in the distribution and size of the spots or speckles of laser light illumination on the photosensitive recording layer, can be obtained by overlaying the fibre optic plate, or ground glass plate, (whichever is used) with an aperture mask or screen (28, FIG. 3) comprising an opaque sheet or layer formed with an array of light transmitting holes therein. The last-noted screen may be placed in contact with the upper surface of the fibre optic plate or the ground glass screen, as shown in FIG. 3, or may be spaced therefrom, for example by a transparent (e.g. Mylar) sheet or windowed spacer of the sort referred to above for spacing the optic fibre plate from the photosensitive recording layer. Alternatively, the aperture mask or screen may be placed in contact with the lower surface of the fibre optic plate or the ground glass screen or may be spaced from the latter. The aperture mask should, in any case, be spaced somewhat from the surface of the photographic emulsion. It has been found that if such an overlay screen (also referred to herein as an aperture screen) is used having such holes which are elongate in a predetermined direction in the plane of the screen, the light spots or speckles produced on the recording layer exhibit a net preferential elongation in a perpendicular direction in the plane of the recording layer. This produces, in the microlens screen produced using the mask derived from the recording layer, microlenses having greater optical power in a plane perpendicular to the direction of elongation of the lenses than parallel thereto, so that, for example, when the microlens screen is used as a diffuser, the screen may be arranged to have different polar distribution for light diffused thereby about two mutually perpendicular axes in the plane of the screen. The effect produced by preferentially elongate microlenses is discussed in more detail in WO91/18304.

It is also possible to produce a diffusion screen by exposing a photopolymerisable monomer of the kind referred to directly through a fibre optic plate, using the fibre optic plate itself as a contact printing screen placed directly in contact with the monomer and exposing the monomer to ultraviolet light through the fibre optic plate producing localised exposure at the end of each "fibre" or light-transmitting channel in the fibre optic plate, allowing corresponding localised polymerisation of the monomer in these exposed areas and subsequently, for example after stripping the photopolymer/monomer layer from the fibre optic plate, subjecting the photopolymer/monomer to a blanketing exposure to ultra-violet light to polymerise the remaining monomer. In this variant, the fibre optic plate performs the same function as the aperture screen in the method disclosed in EP0294122 However, the fibre optic screen has the advantage of collimating the light passing therethrough, improving uniformity in exposure over the area of the plate and enhancing the "contrast" of the recorded pattern.

Another way in which selective elongation of the speckles in the speckle pattern forming the basis of a mask for making a diffusion screen of photopolymer can be produced is by using, as the scanned laser beam in the technique described above with reference to FIG. 1, a laser beam having a non-circular cross-section which is elongated preferentially in one cross-sectional direction, for example which is elliptical in section. This affords a similar effect to the superimposed aperture screen with preferentially elongate apertures, as described above or to the use of a frame of elongate shape around the ground glass screen as also described above, in that the speckles in the speckle pattern are preferentially elongate along an axis perpendicular to the major axis of the beam cross-section.

It is possible to use, in this context, a diode laser, known per se, which produces a laser beam of naturally elliptical cross-section.

It would, however, be possible to produce a laser beam of elliptical cross-section, or other asymmetric cross section in some other way, for example by passing a laser beam of circular cross-section initially through a suitable masking arrangement or through an optical arrangement known per se, for example utilizing an anamorphic optical prism system, for changing a circular cross-section beam into an elliptical cross-section beam. Such a prism system may also be used, "in reverse", to convert a circular cross-section laser beam, for example from a He—Ne laser, into a beam of elliptical cross-section, where preferential elongation of the speckles in any particular direction is not desired.

The small size and weight of a laser diode make it feasible to mount the latter directly upon a transverse scan carriage of the apparatus referred to above. Thus the laser diode may be mounted just above the ground glass or other diffusion screen arranged above the photographic medium.

Figure 4:
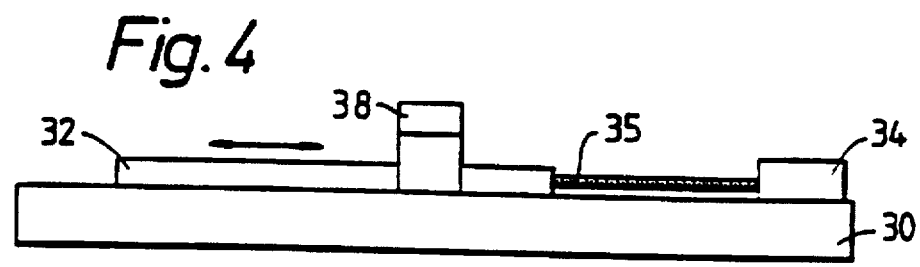
FIG. 4 is a schematic side view of an apparatus which may be used in manufacturing a mask for making a photopolymer diffusion screen.
Figure 5:
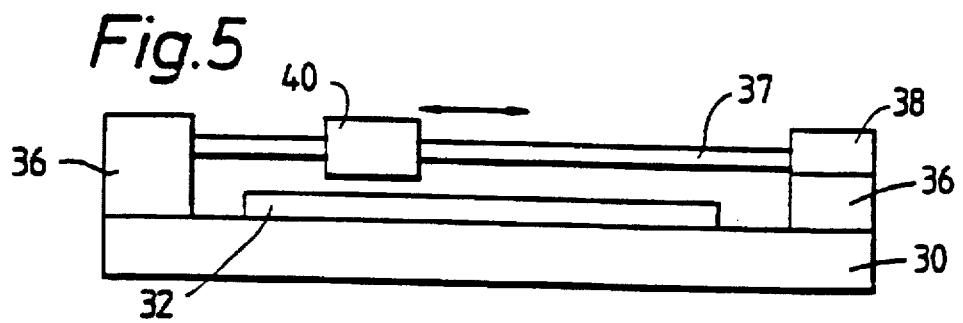
FIG. 5 is an end view of the machine of FIG. 4.

Thus, as shown schematically in FIGS. 4 and 5 the fixed bed of the machine used is indicated at 30, the platen, indicated at 32, being guided for longitudinal movement on the bed 30, such movement being effected by computer-controlled motor means illustrated schematically at 34 which may, for example, advance the platen by means of a screw indicated at 35. Secured to the bed 30 on either side of platen 32 are members 36 which support guide means, such as a horizontal bar or rail 37 extending horizontally above the platen, and thus above the photographic medium, and ground glass plate or other diffuser (not shown) supported on the platen. Further computer-controlled motor means 38, e.g. carried by members 36 is operable to index, along the rail 37, a carriage 40 carrying the diode laser and associated optics (not shown). As indicated above, the sheet of photographic recording medium, with the ground glass plate or other diffuser, and intervening spacers (if used) are all secured to the upper surface of the platen 32. These items are omitted, for clarity of illustration, in FIGS. 4 and 5.

It has also been found that a speckle pattern of improved contrast can be produced in the photographic recording medium if the laser, instead of being energised continuously during scanning, is repeatedly turned on and off, so that there is a discrete transverse displacement of the beam relative to the ground glass or equivalent screen between one "on" period of the laser and the next. The use of a laser diode, as described above, makes it relatively easy to implement this technique.

Preferably, the laser diode is indexed stepwise in its transverse scan so that whilst the laser is "on" the diode is stationary relative to the photographic medium and ground glass screen or other diffuser, the laser being switched off before moving the diode transversely to its next position, where it is again switched "on", and so on. Thus, each time the diode laser is switched "on" a respective elliptical patch of the ground glass screen is illuminated by the laser beam. The magnitude of each indexing step is such that there is some overlap between adjacent elliptical patches. Likewise, the amount by which the platen of the machine is advanced between line scans is such that there is an overlap between successive scan lines, i.e. between successive rows of such elliptical patches. Typically, the width of the laser beam might be around 1 mm to ½ mm measured along the major axis of its cross-section and around 0.6 mm to 0.3 mm measured along the minor axis of its cross-section, and the displacement of the diode between exposure of adjacent patches in a line scan and the displacement of the machine platen between successive line scans may be such that each patch overlaps the adjacent patch by half its width in the line scan direction and each line overlaps the adjacent line by half its width. It has been found that the technique described of switching the laser off and on during line scans, particularly when so conducted that the laser diode and the laser beam are stationary relative to the ground glass or other diffusion screen whilst the laser is on, results in a significantly improved contrast in the speckle pattern, so much so that a ground glass screen is quite adequate. This makes possible the production of relatively large masks, and consequently relatively large photopolymer diffusion screens, for large ground glass screens can be produced relatively inexpensively, whereas the production costs of large fibre optic plates, for example, are very high indeed.

The technique described above of switching the laser on and off during line scans, preferably executed in a step-wise fashion, may, of course, be carried out even where some other form of laser is used, such as a gas laser or ruby laser. Furthermore, the last noted technique may be used also in cases where the laser beam is of circular cross-section so that no preferential elongation of the speckles is produced. In this connection the elliptical cross-section beam of the diode laser may be converted into a circular cross-section beam using an anamorphic optical prism system.

The use of a diode laser producing red laser light, in conjunction with a red-sensitive photographic medium has been found to be particularly advantageous, since the speckles resulting are larger than those obtained using light of shorter wavelength and appear to be of a size affording optimum performance of the photopolymer diffusion screens derived using this technique. In addition, red-sensitive photographic medium is available in large sheets of film, which presents cost advantages and processing advantages over glass plates. It will be appreciated, of course, that the use of a diode laser is not confined to cases where preferential elongation of the speckles in any particular direction is desired, but has advantages even where no preferential elongation is desired and where, consequently, an anamorphic prism system must also be mounted on the carriage 40, in association with such diode laser.

It should be appreciated that, in the speckle pattern produced either using a circular-section laser beam or an elliptical section beam, the individual speckles are irregular in shape, the shape varying randomly from speckle to speckle. The preferential elongation referred to, in the above discussion of the effects produced using an elliptical-section beam or aperture mask with elongate apertures, shows itself as a difference in mean length of the speckles, measured along the direction of preferential elongation, as compared with mean length measured in a perpendicular direction.

A diffusion screen, e.g. for use as a rear projection screen or as a depixelating screen, may be formed using a mask produced as described above by providing a layer of photopolymerisable monomer, placing the mask into intimate contact with the monomer layer, with the chromium coated, etched side of the mask contacting the monomer, and then exposing the monomer to ultraviolet light through the mask to bring about selective polymerisation of monomer in the regions so exposed. The monomer/photopolymer layer may be stripped from the mask after exposure but before polymerisation has been completed, or may be left in contact with the mask during polymerisation, to be stripped from the mask afterwards.

Preferably at least one surface of the monomer layer is left free to deform during the selective polymerisation, whereby a surface contouring corresponding to the speckle pattern of the mask is produced in the respective surface. After the selective photopolymerisation referred to above, the monomer/polymer sheet is given a blanketing exposure to ultraviolet light to polymerise the remaining monomer.

The photopolymer used may be that supplied by Du Pont under the Registered Trade Mark OMNIDEX and having the type designation HRF150 or HRF600. The monomer in the HRF series photopolymers is fluorescent N-vinyl-carbazole (NVC) dispersed in a plasticized polyvinyl acetate (PVAC), cellulose acetate butyrate (CAB) or polyvinyl butyrate (PVB) as the polymeric binder. The material may be initiated either by photoinitiators or by a photosensitizing dye/initiator combination.

The OMNIDEX materials are available in sheet form, comprising a layer of the monomer on a polyester film base (MYLAR) the layer being entirely covered with a polyester (MYLAR) film.

A microlens screen produced using a mask made in accordance with the invention may be used for de-pixelation of pixelated displays, as discussed above, or may be used as a back-projection screen or for other purposes, e.g. for diffusion of light.

A photopolymer diffusion screen made as described above may also be used as, in effect, a collimating device which may be placed behind a back-lit LCD display screen and the respective light source behind the LCD screen, to ensure that, from the point of view of the observer of such an LCD screen, the screen is more uniformly illuminated over its area, by the back-lighting light source, than it would otherwise seem to be. A further photopolymer diffusion screen may of course be arranged in front of the LCD display screen for depixelating purposes, that is to say, to lessen the perception of the individual pixels of the LCD display screen without degrading the perceived image.

We claim:

1. A method of manufacturing a mask for use in making a diffusion screen of photopolymer, comprising providing a fibre optic plate having a measure of randomisation incorporated therein, providing a photosensitive recording layer, superimposing said fibre optic plate on said photosensitive recording layer, exposing said photosensitive recording layer to light through said fibre optic plate, removing said fibre optic plate and deriving said mask from said photosensitive recording layer.

2. The method according to claim 1, wherein said fibre optic plate is juxtaposed with an aperture mask before exposure of the photosensitive recording layer, and wherein said photosensitive recording layer is exposed to light through the juxtaposed aperture mask and fibre optic plate.

3. The method according to claim 2, wherein the apertures in said aperture mask are preferentially elongate in a predetermined direction in the plane of said aperture mask.

4. The method according to claim 1, wherein the exposure of said photosensitive recording layer is effected by means of a scanning laser arranged to scan said fibre optic plate in a predetermined scanning raster.

5. The method according to claim 4 wherein, in operation of said scanning laser, each scan line is formed by a series of successive exposures, the laser being deenergised between successive exposures and at least part of the line scan movement taking place in the intervals between energisation of the laser.

6. The method according to claim 4, wherein the scanning laser used has a beam of cross-section of greater dimension in one direction than in a perpendicular direction.

7. The method according to claim 1, wherein said photosensitive recording layer comprises a layer of high-definition silver halide photographic emulsion on a transparent substrate and wherein, after development of said emulsion layer, the resulting transparency is used to produce a corresponding working mask comprising a thin layer of chromium on a transparent substrate and in which apertures are formed through the chromium layer in accordance with the spot or speckle pattern recorded on the emulsion.

8. A mask, for use in producing a diffusion screen, the mask having been produced by the method of claim 1.

9. A diffusion or depixelating screen comprising a layer of a photopolymer having distributed thereover, in accordance with a random speckle pattern, localised regions of graded refractive index variation and/or localised contour variations, which have been produced by exposure of the corresponding monomer to a polymerising light speckle pattern, wherein said exposure has been effected by exposure through a mask according to claim 8.

10. A method of manufacturing a diffusion or depixelating screen, comprising providing a layer of a photopolymerisable monomer, superimposing on said layer a mask in accordance with claim 8, exposing said monomer to polymerising light through said mask, and allowing selective polymerisation of the monomer in the regions so exposed, and subsequently subjecting the entire monomer layer to a blanket exposure to polymerising light.

11. The method according to claim 10, wherein at least one surface of the monomer layer is left free to deform during said polymerisation whereby a surface contouring corresponding to said speckle pattern is produced.

12. A method of manufacturing a mask for use in making a diffusion screen of photopolymer, comprising:

provide a ground glass plate having a ground surface, said ground glass plate having a measure of randomisation in the spatial distribution of its light transmitting characteristics;

providing a photosensitive recording layer;

superimposing said ground glass plate on said photosensitive recording layer with said ground surface spaced from said photosensitive recording layer;

exposing said photosensitive recording layer to light through said ground glass plate;

removing said ground glass plate; and deriving said mask from said photosensitive recording layer.

13. The method according to claim 12, wherein said ground glass plate is juxtaposed with an aperture mask before exposure of the photosensitive recording layer, and wherein said photosensitive recording layer is exposed to light through the juxtaposed aperture mask and ground glass plate.

14. The method according to claim 12, wherein the exposure of said photosensitive recording layer is effected by means of a scanning laser arranged to scan said ground glass plate in a predetermined scanning raster.

15. The method according to claim 14 wherein, in operation of said scanning laser, each scan line is formed by a series of successive exposures, the laser being deenergised between successive exposures and at least part of the line scan movement taking place in the intervals between energisation of the laser.

16. The method according to claim 14, wherein the scanning laser used has a beam of cross-section of greater dimension in one direction than in a perpendicular direction.

17. The method according to claim 12, wherein said photosensitive recording layer comprises a layer of high-definition silver halide photographic emulsion on a transparent substrate and wherein, after development of said emulsion layer, the resulting transparency is used to produce a corresponding working mask comprising a thin layer of chromium on a transparent substrate and in which apertures are formed through the chromium layer in accordance with the spot or speckle pattern recorded on the emulsion.

18. A mask, for use in producing a diffusion screen, the mask having been produced by the method of claim 12.

19. A diffusion or depixelating screen comprising a layer of a photopolymer having distributed thereover, in accordance with a random speckle pattern, localised regions of graded refractive index variation and/or localised contour variations, which have been produced by exposure of the corresponding monomer to a polymerising light speckle pattern.

20. A mask, for use in producing a diffusion screen for diffusing light, the mask including a transparent substrate, a thin opaque layer on said substrate and a plurality of openings or windows in said opaque layer, said openings or windows being randomly distributed and being individually of irregular shape differing randomly from one such opening or window to the next.

* * * * *

UNITED STATES PATENT AND TRADEMARK OFFICE
CERTIFICATE OF CORRECTION

PATENT NO. : 5,695,895
DATED : December 9, 1997
INVENTOR(S) : William N. H. Johnson et al.

It is certified that error appears in the above-identified patent and that said Letters Patent is hereby corrected as shown below:

Column 1 Line 3 after the title insert --BACKGROUND OF THE INVENTION--.

Signed and Sealed this

Seventeenth Day of March, 1998

Attest:

BRUCE LEHMAN

Attesting Officer

Commissioner of Patents and Trademarks